(12) United States Patent
Perez-Pena et al.

(10) Patent No.: US 7,670,427 B2
(45) Date of Patent: Mar. 2, 2010

(54) VERY FAST SETTING CEMENTITIOUS COMPOSITION WITH HIGH EARLY-AGE COMPRESSIVE STRENGTH

(75) Inventors: Marianela Perez-Pena, Grayslake, IL (US); Yanfei Peng, Gurnee, IL (US); Srinivas Veeramasuneni, Round Lake, IL (US)

(73) Assignee: United States Gypsum Company, Chicago, IL (US)

( * ) Notice: Subject to any disclaimer, the term of this patent is extended or adjusted under 35 U.S.C. 154(b) by 329 days.

(21) Appl. No.: 11/758,947

(22) Filed: Jun. 6, 2007

(65) Prior Publication Data

US 2008/0302276 A1  Dec. 11, 2008

(51) Int. Cl.
*C04B 24/12* (2006.01)
*C04B 22/16* (2006.01)

(52) U.S. Cl. .................. 106/727; 106/819; 106/823
(58) Field of Classification Search ............... 106/727, 106/819, 823
See application file for complete search history.

(56) References Cited

U.S. PATENT DOCUMENTS

| | | |
|---|---|---|
| 3,342,761 A | 9/1967 | Wilkinson et al. |
| 3,661,603 A | 5/1972 | Nicol |
| 4,012,264 A | 3/1977 | Murray et al. |
| 4,052,347 A | 10/1977 | Dieterich et al. |
| 4,059,455 A | 11/1977 | Limes et al. |
| 4,129,449 A | 12/1978 | Kojima |
| 4,350,533 A | 9/1982 | Galer et al. |
| 4,373,956 A | 2/1983 | Rosskopf |
| 4,488,909 A | 12/1984 | Galer et al. |
| 4,891,072 A | 1/1990 | Cooper |
| 5,221,386 A | 6/1993 | Ensminger et al. |
| 5,286,425 A | 2/1994 | Babcock et al. |
| 5,643,510 A | 7/1997 | Sucech |
| 5,665,158 A | 9/1997 | Darwin et al. |
| 5,728,207 A | 3/1998 | Arfaei et al. |
| 6,051,061 A | 4/2000 | Sawamura et al. |
| 6,136,088 A | 10/2000 | Farrington |
| 6,187,409 B1 | 2/2001 | Mathieu |
| 6,224,250 B1 | 5/2001 | Kreinheder et al. |
| 6,264,740 B1 | 7/2001 | McNulty, Jr. |
| 6,267,814 B1 | 7/2001 | Bury et al. |
| 6,299,677 B1 | 10/2001 | Johnson et al. |
| 6,352,952 B1 | 3/2002 | Jardine et al. |
| 6,458,423 B1 | 10/2002 | Goodson |
| 6,641,658 B1 | 11/2003 | Dubey |
| 6,648,964 B2 | 11/2003 | Mentink et al. |
| 6,858,074 B2 | 2/2005 | Anderson et al. |
| 6,869,474 B2 * | 3/2005 | Perez-Pena et al. ......... 106/727 |
| 7,125,944 B2 | 10/2006 | Yamashita et al. |

(Continued)

FOREIGN PATENT DOCUMENTS

WO  83/01061 A1  3/1983

(Continued)

*Primary Examiner*—Paul Marcantoni
(74) *Attorney, Agent, or Firm*—Novak, Druce + Quigg LLP

(57) ABSTRACT

A method of making a rapid setting composition for cement boards is disclosed. Compositions including portland cement, fly ash, gypsum, alkanolamine and phosphate are disclosed. A synergistic interaction between the alkanolamine and phosphate increases the effectiveness of accelerating reactions thus allowing for quick setting and increased early-age compressive strength compositions.

42 Claims, 2 Drawing Sheets

U.S. PATENT DOCUMENTS

| | | |
|---|---|---|
| 2005/0103235 A1 | 5/2005 | Harrison |
| 2006/0269752 A1 | 11/2006 | Holland et al. |
| 2006/0280898 A1 | 12/2006 | Lettkeman et al. |
| 2006/0292358 A1 | 12/2006 | Robertson et al. |
| 2007/0054059 A1 | 3/2007 | Nakashima et al. |
| 2007/0079733 A1 | 4/2007 | Crocker |

FOREIGN PATENT DOCUMENTS

| | | | |
|---|---|---|---|
| WO | 2005019131 A1 | 3/2005 | |

* cited by examiner

VERY FAST SETTING CEMENTITIOUS COMPOSITION WITH HIGH EARLY-AGE COMPRESSIVE STRENGTH

FIELD OF THE INVENTION

This invention relates generally to very fast setting cementitious compositions that can be used for a variety of applications in which rapid hardening and attainment of early strength is desirable. In particular, the invention relates to cementitious compositions that can be used to make boards with excellent moisture durability for use in wet and dry locations in buildings. Precast concrete products such as cement boards are made under conditions which provide a rapid setting of the cementitious mixture so that the boards can be handled soon after the cementitious mixture is poured into a stationary or moving form or over a continuously moving belt. Ideally, this setting of the cement mixture may be achieved as soon as about 30 minutes, preferably as soon as 20 minutes, more preferably as soon as 10 minutes, most preferably as soon as 5 minutes, after mixing the cement mixture with a suitable amount of water.

BACKGROUND OF THE INVENTION

U.S. Pat. No. 6,869,474 to Perez-Pena et al., incorporated herein by reference, discusses extremely fast setting of cementitious compositions for producing cement-based products such as cement boards achieved by adding an alkanolamine to a hydraulic cement such as Portland cement, and forming a slurry with water under conditions that provide an initial slurry temperature of at least 90° F. (32° C.). Additional reactive materials may be included such as high alumina cement, calcium sulfate and a pozzolanic material such as fly ash. The extremely rapid set permits rapid production of cementitious products. Triethanolamine additions have been found to be a very powerful accelerator capable of producing formulations with relatively short final setting times with increased levels of fly ash and gypsum and without the need of calcium aluminate cements. However, formulations with triethanolamine also had relatively lower early-age compressive strength compared to cement board formulations containing the calcium aluminate cements.

U.S. Pat. No. 4,488,909 to Galer et al., incorporated herein by reference, discusses cementitious compositions capable of rapid setting. The compositions permit high speed production of carbon dioxide resistant cement boards by forming essentially all of the potential ettringite within about 20 minutes after the composition is mixed with water. The essential components of the cementitious composition are portland cement, high alumina cement, calcium sulfate and lime. Pozzolans such as fly ash, montmorillonite clay, diatomaceous earth and pumicite may be added up to about 25%. The cement composition includes about 14 to 21 wt % high alumina cement, which in combination with the other components makes possible the early formation of ettringite and other calcium aluminate hydrates responsible for early setting of the cementitious mixture. In their invention, Galer et al. provided aluminates using high alumina cement (HAC) and sulfate ions using gypsum to form ettringite and achieve rapid setting of their cementitious mixture.

Ettringite is a calcium aluminum sulfate compound having the formula $Ca_6Al_2(SO_4)_3 \cdot 32 H_2O$ or alternatively $3 CaO \cdot Al_2O_3 \cdot 3 CaSO_4 \cdot 32 H_2O$. Ettringite forms as long needle-like crystals and provides rapid early strength to cement boards, so that they can be handled soon after being poured into a mold or over a continuous casting and forming belt.

In general, Galer et al's rapid setting formulation suffers from several limitations. These limitations, as highlighted below, are even more of a concern for the production of cementitious products such as cement boards.

The final setting times of the cementitious mixtures are typically greater than 9 minutes. The final setting time is defined further in the examples below, but more generally, the cementitious mixtures have set to the extent that the cement-based products made thereof can be handled and stacked, although chemical reactions may continue for extended periods.

The amount of high alumina cement (also known as calcium aluminate cement) in the reactive powder blend is very high. Typically, the high alumina cement is greater than 14 wt % of the reactive powder blend.

The amount of pozzolanic materials is limited to 25 wt % of the reactive powder blend.

Lime is required as an additional ingredient to obtain rapid set. Presence of excess lime in cement boards is detrimental to their long-term durability performance. Cement boards often are reinforced with polymer coated glass fiber mesh that degrades, losing strength and ductility in a high alkaline environment. Presence of excess lime increases the alkalinity of the cementitious matrix and thereby negatively impacts the long-term durability performance of the polymer coated glass fiber mesh and the resulting cement boards. In addition, presence of excess lime also makes the concrete susceptible to sulfate attack thus influencing its durability.

SUMMARY OF THE INVENTION

It is an object of the present invention to provide a method of providing a fast setting slurry comprising mixing water at elevated temperatures, a cementitious reactive powder comprising hydraulic cement, and accelerating amounts of alkanolamine and polyphosphate.

It is another object of the present invention to provide cementitious compositions with enhanced rapid final setting performance and enhanced early compressive strength. The cementitious compositions contain alkanolamine and polyphosphate.

Thus, this invention relates generally to very fast setting cementitious compositions, and methods of making such compositions, that can be used for a variety of applications in which rapid hardening and attainment of early strength is desirable. Using the alkanolamine in combination with the polyphosphate to accelerate setting of the cementitious composition, when the slurry is formed at elevated temperatures, makes possible increased rate of production of cementitious products such as cement boards while reducing alkanolamine levels.

The cementitious compositions of the present invention can be used to make precast concrete products such as cement boards with excellent moisture durability for use in wet and dry locations in buildings. The precast concrete products such as cement boards are made under conditions which provide a rapid setting of the cementitious mixture so that the boards can be handled soon after the cementitious mixture is poured into a stationary or moving form or over a continuously moving belt.

Rapid set is achieved by preparing the slurry containing a mixture of water, a cementitious reactive powder comprising hydraulic cement, and set accelerating amounts of alkanolamine and polyphosphate at above ambient temperatures, for example at least about 90° F. (32.2° C.), more preferably at least about 100° F. (38° C.) or at least about 105° F. (41° C.) or at least about 110° F. (43° C.). Typically the slurry has an initial temperature of about 90° F. to 160° F. (32° C. to 71° C.) or about 90° F. to 135° F. (32° C. to 57° C.), most preferably about 120 to 130° F. (49 to 54° C.).

The final setting time (i.e., the time after which cement boards can be handled) of the cementitious composition as measured according to the Gilmore needle should be at most 30 minutes, preferably at most 20 minutes, more preferably at most 10 minutes or at most 5 minutes after being mixed with a suitable amount of water. A shorter setting time and higher early compressive strength helps to increase the production output and lower the product manufacturing cost.

The dosage of alkanolamine in the slurry is preferably in the range of about 0.025 to 4.0 wt %, more preferably about 0.025 to 2.0 wt %, furthermore preferably about 0.025 to 1 wt. % or about 0.05 to 0.25 wt. %, and most preferably about 0.05 to 0.1 wt. % based on the cementitious reactive components of the invention. Triethanolamine is the preferred alkanolamine. However, other alkanolamines, such as monoethanolamine and diethanolamine, may be substituted for triethanolamine or used in combination with triethanolamine.

The dosage of the polyphosphate is about 0.15 to 1.5 wt. %, preferably about 0.3 to 1.0 wt. % and more preferably about 0.4 to 0.75 wt. % based on the cementitious reactive components of the invention. While the preferred phosphate is the sodium trimetaphosphate (STMP), formulations with other polyphosphates such as potassium tripolyphosphate (KTPP), sodium tripolyphosphate (STPP), tetrasodium pyrophosphate (TSPP) and tetrapotassium pyrophosphate (TKPP) also provide enhanced final setting performance and enhanced compressive strength at reduced triethanolamine levels.

As mentioned above, these weight percents are based on the weight of the reactive components (cementitious reactive powder). This will include at least a hydraulic cement, preferably portland cement, and also may include calcium aluminate cement, calcium sulfate, and a mineral additive, preferably fly ash, to form a slurry with water. Cementitious reactive powder does not include inerts such as aggregate.

A typical cementitious reactive powder includes about 40 to 80 wt % Portland cement and about 20 to 60 wt % fly ash wherein weight percent is based on the sum of the portland cement and fly ash.

Another typical cementitious reactive powder includes about 40 to 80 wt % portland cement, zero to 20 wt % calcium aluminate cement, zero to 7 wt % calcium sulfate, zero to 55 wt % fly ash, based on the sum of the portland cement, calcium aluminate cement, calcium sulfate and fly ash. Thus, the cementitious reactive powder blend of the cementitious composition may contain concentrations of mineral additives, such as pozzolanic materials, up to 55 wt % of the reactive powder blend. Increasing the content of mineral additives, e.g. fly ash, would help to substantially lower the cost of the product. Moreover, use of pozzolanic materials in the composition would also help to enhance the long-term durability of the product as a consequence of the pozzolanic reactions.

The reactive powder blend of the cementitious composition should be free of externally added lime. Reduced lime content would help to lower the alkalinity of the cementitious matrix and thereby increase the long-term durability of the product.

There is a synergistic interaction between the polyphosphate and the alkanolamine. Adding the polyphosphate and alkanolamine has the benefits of achieving a short final set and increasing early compressive strength for compositions with reduced alkanolamine dosages as compared to compositions lacking the polyphosphate.

In addition, adding the polyphosphate improves mix fluidity contrary to other accelerators such as aluminum sulfate which may lead to premature stiffening of concrete mixtures.

Mineral additives possessing substantial, little, or no cementing properties may be included in the rapid setting composite of the invention. Mineral additives possessing pozzolanic properties, such as class C fly ash, are particularly preferred in the reactive powder blend of the invention. Aggregates and fillers may be added depending on the application of the rapid setting cementitious composition of the invention.

Other additives such as one or more of sand, aggregate, lightweight fillers, water reducing agents such as superplasticizers, set accelerating agents, set retarding agents, air-entraining agents, foaming agents, shrinkage control agents, slurry viscosity modifying agents (thickeners), coloring agents and internal curing agents, may be included as desired depending upon the processability and application of the cementitious composition of the invention.

If desired the reactive powder blend of the invention may include or exclude calcium aluminate cement (CAC) (also commonly referred to as aluminous cement or high alumina cement) and/or calcium sulfate. In another embodiment the reactive powder blend excludes high alumina cement and includes as reactive powder components only portland cement and an optional mineral additive, preferably fly ash, at least one alkanolamine, at least one phosphate, and additives.

All percentages, ratios and proportions herein are by weight, unless otherwise specified.

DETAILED DESCRIPTION OF THE INVENTION

Figure 1:
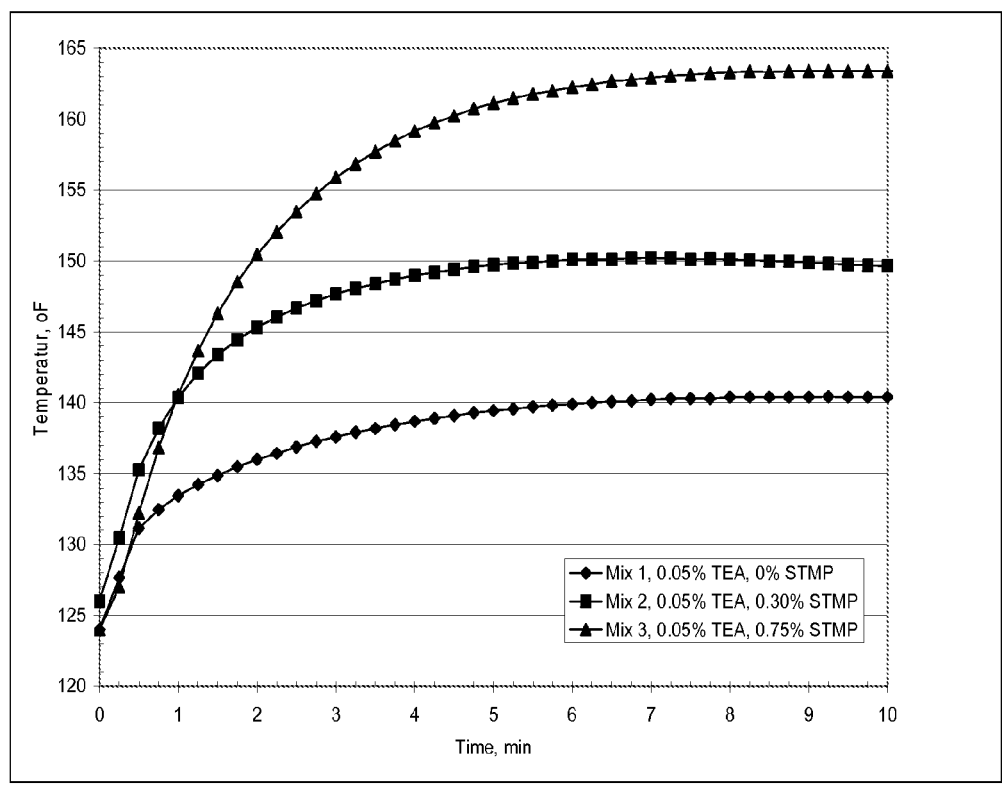
FIG. 1 is a graph of the results of Example 1 showing the effect of increasing STMP on the temperature rise measured for mixes containing 0.05% triethanolamine.

The present invention mixes cementitious reactive powder with alkanolamine, polyphosphate and water at an initial slurry temperature of at least 90° F. (32.2° C.) to yield a rapid set of less than 30 minutes, more preferably less than 20 minutes, and most preferably less than 10 minutes or less than 5 minutes.

The present invention also provides cementitious compositions with enhanced rapid final setting performance and enhanced early compressive strength.

While not wishing to be limited to a particular theory, it is theorized that rapid sets are achieved by providing the cementitious reactive powder, e.g., 40-80 wt % portland cement, 0-20 wt % calcium aluminate cement, 0-7 wt % calcium sulfate, and 0-55 wt % mineral additive and mixing the cementitious reactive powder, alkanolamine, polyphosphate and water to form slurry at elevated temperatures above 90° F. (32.2° C.) so that formation of ettringite and/or other hydrates of calcium aluminate and/or calcium phosphate compounds can take place as a result of the hydration of this reactive powder blend.

Thus, a suitable amount of water is provided to hydrate the cementitious reactive powder and to rapidly form ettringite, other hydrates of calcium aluminate compounds and/or calcium phosphate. Generally, the amount of water added will be greater than theoretically required for the hydration of the cementitious reactive powder. This increased water content facilitates the workability of the cementitious slurry.

Typically, in the slurry the weight ratio of the water to cementitious reactive powder blend is about 0.20/1 to 0.80/1, preferably about 0.30/1 to 0.60/1. The amount of water depends on the needs of the individual materials present in the cementitious composition.

Ettringite, other hydrates of calcium aluminate and/or calcium phosphate compounds form very rapidly in the hydration process thus imparting rapid set and rigidity to the mixtures made with the cementitious reactive powder blend of the cementitious composition of the invention. In manufacturing of cement-based products such as cement boards, it is primarily the formation of ettringite, other calcium aluminate hydrates and/or calcium phosphate compounds that makes possible handling of cement boards within a few minutes after the cementitious composition of the invention is mixed with a suitable amount of water.

Setting of the composition is characterized by initial and final set times, as measured using Gilmore needles specified in the ASTM C266 test procedure. The final set time also corresponds to the time when a cement-based product, e.g. a cement board, has sufficiently hardened so that it can be handled. It will be understood by those skilled in the art that curing reactions continue for extended periods after the final setting time has been reached.

Early age strength of the composition is characterized by measuring the compressive strength after 5 hours of curing as specified in the ASTM C109. Achieving high early strength allows for ease of handling the stacked panels.

Cementitious Reactive Powder

The principal ingredient of the cementitious reactive powder of the cementitious composition of the invention is a hydraulic cement, preferably portland cement.

Other ingredients may include high alumina cement, calcium sulfate, and a mineral additive, preferably a pozzolan such as fly ash. Preferably, calcium aluminate cement and calcium sulfate are used in small amounts and preferably excluded, leaving only the hydraulic cement, the mineral additive, and alkanolamine and phosphate as accelerators.

When the cementitious reactive powder of the invention includes only portland cement and fly ash, the reactive powder typically contains 40-80 wt % portland cement and 20-60 wt % fly ash, based on the sum of these components.

When other ingredients are present, the cementitious reactive powder may typically contain 40-80 wt % portland cement, 0 to 20 wt % calcium aluminate cement, 0 to 7 wt % calcium sulfate, and 0 to 55 wt % fly ash based on the sum of these components.

Hydraulic Cement

Hydraulic cements, such as portland cement, make up a substantial amount of the compositions of the invention. It is to be understood that, as used here, "hydraulic cement" does not include gypsum, which does not gain strength under water, although typically some gypsum is included in portland cement. ASTM C 150 standard specification for portland cement defines portland cement as a hydraulic cement produced by pulverizing clinker consisting essentially of hydraulic calcium silicates, usually containing one or more of the forms of calcium sulfate as an inter-ground addition. More generally, other hydraulic cements may be substituted for portland cement, for example calcium sulfo-aluminate based cements. To manufacture portland cement, an intimate mixture of limestone and clay is ignited in a kiln to form portland cement clinker. The following four main phases of portland cement are present in the clinker-tricalcium silicate ($3CaO.SiO_2$, also referred to as $C_3S$), dicalcium silicate ($2CaO.SiO_2$, called $C_2S$), tricalcium aluminate ($3CaO.Al_2O_3$ or $C_3A$), and tetracalcium aluminoferrite ($4CaO.Al_2O_3.Fe_2O_3$ or $C_4AF$). The resulting clinker containing the above compounds is inter-ground with calcium sulfates to desired fineness to produce the portland cement.

The other compounds present in minor amounts in portland cement include double salts of alkaline sulfates, calcium oxide, and magnesium oxide. When cement boards are to be made, the portland cement will typically be in the form of very fine particles such that the particle surface area is greater than 4,000 $cm^2$/gram and typically between 5,000 to 6,000 $cm^2$/gram as measured by the Blaine surface area method (ASTM C 204). Of the various recognized classes of portland cement, ASTM Type III portland cement is most preferred in the cementitious reactive powder of the cementitious compositions of the invention. This is due to its relatively faster reactivity and high early strength development.

In the present invention, the need for the use of Type III portland cement is minimized and relatively fast early age strength development can be obtained using other cements instead of Type III portland cement. The other recognized types of cements which may be used to replace or supplement Type III portland cement in the composition of the invention include Type I portland cement, or other hydraulic cements including Type II portland cement, white cement, slag cements such as blast-furnace slag cement, pozzolan blended cements, expansive cements, sulfo-aluminate cements, and oil-well cements.

Mineral Additives

The hydraulic cement may be partially substituted by mineral additives possessing substantial, little, or no cementing properties. Mineral additives having pozzolanic properties, such as fly ash, are particularly preferred in the cementitious reactive powder of the invention.

ASTM C618-97 defines pozzolanic materials as "siliceous or siliceous and aluminous materials which in themselves possess little or no cementitious value, but will, in finely divided form and in the presence of moisture, chemically react with calcium hydroxide at ordinary temperatures to form compounds possessing cementitious properties." Various natural and man-made materials have been referred to as pozzolanic materials possessing pozzolanic properties. Some examples of pozzolanic materials include pumice, perlite, diatomaceous earth, silica fume, tuff, trass, rice husk, metakaolin, ground granulated blast furnace slag, and fly ash. All of these pozzolanic materials can be used either singly or in combined form as part of the cementitious reactive powder of the invention. Fly ash is the preferred pozzolan in the cementitious reactive powder blend of the invention. Fly ashes containing high calcium oxide and calcium aluminate content (such as Class C fly ashes of ASTM C618 standard) are preferred as explained below. Other mineral additives such as calcium carbonate, vermiculite, clays, and crushed mica may also be included as mineral additives.

Fly ash is a fine powder byproduct formed from the combustion of coal. Electric power plant utility boilers burning pulverized coal produce most commercially available fly ashes. These fly ashes consist mainly of glassy spherical particles as well as residues of hematite and magnetite, char, and some crystalline phases formed during cooling. The structure, composition and properties of fly ash particles depend upon the structure and composition of the coal and the combustion processes by which fly ash is formed. ASTM C618 standard recognizes two major classes of fly ashes for use in concrete—Class C and Class F. These two classes of fly ashes are derived from different kinds of coals that are a result of differences in the coal formation processes occurring over geological time periods. Class F fly ash is normally produced from burning anthracite or bituminous coal, whereas Class C fly ash is normally produced from lignite or sub-bituminous coal.

The ASTM C618 standard differentiates Class F and Class C fly ashes primarily according to their pozzolanic properties. Accordingly, in the ASTM C618 standard, the major specification difference between the Class F fly ash and Class C fly ash is the minimum limit of $SiO_2+Al_2O_3+Fe_2O_3$ in the composition. The minimum limit of $SiO_2+Al_2O_3+Fe_2O_3$ for Class F fly ash is 70% and for Class C fly ash is 50%. Thus, Class F fly ashes are more pozzolanic than the Class C fly ashes. Although not explicitly recognized in the ASTM C618 standard, Class C fly ashes typically contain high calcium oxide content. Presence of high calcium oxide content makes Class C fly ashes possess cementitious properties leading to the formation of calcium silicate and calcium aluminate hydrates when mixed with water. As will be seen in the examples below, Class C fly ash has been found to provide superior results, particularly in the preferred formulations in which calcium aluminate cement and gypsum are not used.

The weight ratio of the pozzolanic material to the portland cement in the cementitious reactive powder blend used in the cementitious composition of the invention may be about 0/100 to 150/100, preferably 75/100 to 125/100. In some cementitious reactive powder blends the portland cement is about 40 to 80 wt % and fly ash 20 to 60 wt %.

Calcium Aluminate Cement

Calcium aluminate cement (CAC) is another type of hydraulic cement that may form a component of the reactive powder blend of some embodiments of the invention.

Calcium aluminate cement (CAC) is also commonly referred to as aluminous cement or high alumina cement. Calcium aluminate cements have a high alumina content, about 36-42 wt % is typical. Higher purity calcium aluminate cements are also commercially available in which the alumina content can range as high as 80 wt %. These higher purity calcium aluminate cements tend to be very expensive relative to other cements. The calcium aluminate cements used in the compositions of some embodiments of the invention are finely ground to facilitate entry of the aluminates into the aqueous phase so that rapid formation of ettringite and other calcium aluminate hydrates can take place. The surface area of the calcium aluminate cement that may be used in some embodiments of the composition of the invention will be greater than 3,000 cm²/gram and typically about 4,000 to 6,000 cm²/gram as measured by the Blaine surface area method (ASTM C 204).

Several manufacturing methods have emerged to produce calcium aluminate cement worldwide. Typically, the main raw materials used in the manufacturing of calcium aluminate cement are bauxite and limestone. One manufacturing method that has been used in the US for producing calcium aluminate cement is described as follows. The bauxite ore is first crushed and dried, then ground along with limestone. The dry powder comprising of bauxite and limestone is then fed into a rotary kiln. A pulverized low-ash coal is used as fuel in the kiln. Reaction between bauxite and limestone takes place in the kiln and the molten product collects in the lower end of the kiln and pours into a trough set at the bottom. The molten clinker is quenched with water to form granulates of the clinker, which is then conveyed to a stock-pile. This granulate is then ground to the desired fineness to produce the final cement.

Several calcium aluminate compounds are formed during the manufacturing process of calcium aluminate cement. The predominant compound formed is monocalcium aluminate ($CaO.Al_2O_3$, also referred to as CA). The other calcium aluminate and calcium silicate compounds that are formed include $12CaO.7Al_2O_3$ also referred to as $C_{12}A_7$, $CaO.2Al_2O_3$ also referred as $CA_2$, dicalcium silicate ($2CaO.SiO_2$, called $C_2S$), dicalcium alumina silicate ($2CaO.Al_2O_3.SiO_2$, called $C_2AS$). Several other compounds containing relatively high proportion of iron oxides are also formed. These include calcium ferrites such as $CaO.Fe_2O_3$ or CF and $2CaO.Fe_2O_3$ or $C_2F$, and calcium alumino-ferrites such as tetracalcium aluminoferrite ($4CaO.Al_2O_3.Fe_2O_3$ or $C_4AF$), $6CaO.Al_2O_3 2Fe_2O_3$ or $C_6AF_2$) and $6CaO.2Al_2O_3.Fe_2O_3$ or $C_6A_2F$). Other minor constituents present in the calcium aluminate cement include magnesia (MgO), titania ($TiO_2$), sulfates and alkalis.

Calcium Sulfate

Various forms of calcium sulfate as shown below may be used in the invention to provide sulfate ions for forming ettringite and other calcium sulfo-aluminate hydrate compounds:

Dihydrate—$CaSO_4.2H_2O$ (commonly known as gypsum or landplaster)

Hemihydrate—$CaSO_4.\frac{1}{2}H_2O$ (commonly known as stucco or plaster of Paris or simply plaster)

Anhydrite—$CaSO_4$ (also referred to as anhydrous calcium sulfate)

Landplaster is a relatively low purity gypsum and is preferred due to economic considerations, although higher purity grades of gypsum could be used. Landplaster is made from quarried gypsum and ground to relatively small particles such that the specific surface area is greater than 2,000 cm²/gram and typically about 4,000 to 6,000 cm²/gram as measured by the Blaine surface area method (ASTM C 204). The fine particles are readily dissolved and supply the gypsum needed to form ettringite. Synthetic gypsum obtained as a by-product from various manufacturing industries can also be used as a preferred calcium sulfate in the present invention. The other two forms of calcium sulfate, namely, hemihydrate and anhydrite may also be used in the present invention instead of gypsum, i.e., the dihydrate form of calcium sulfate.

Alkanolamines

In the present invention, different varieties of alkanolamines can be used alone or in combination to accelerate the setting characteristics of the cementitious composition of the invention. A typical family of alkanolamine for use in the present invention is $NH_{3-n}(ROH)_n$ wherein n is 1, 2 or 3 and R is an alkyl having 1, 2 or 3 carbon atoms. Some examples of useful alkanolamines include monoethanolamine [$NH_2(CH_2—CH_2OH)_3$], diethanolamine [$NH(CH_2—CH_2OH)_2$], and triethanolamine [$N(CH_2—CH_2OH)_3$]. Triethanolamine (TEA) is the most preferred alkanolamine in the present invention.

Alkanolamines are amino alcohols that are strongly alkaline and cation active. The alkanolamine, for example triethanolamine, is typically used at a dosage of about 0.025 to 4.0 wt %, preferably about 0.025 to 2.0 wt %, more preferably about 0.025 to 1.0% wt %, furthermore preferably about 0.05 to 0.25 wt. %, and most preferably about 0.05 to 0.1 wt. % based on the weight of the cementitious reactive powder of the invention. Thus for example, for 100 pounds cementitious reactive powder there is about 0.025 to 4.0 pounds of alkanolamine.

Addition of alkanolamines and polyphosphate (described below) has a significant influence on the rapid setting characteristics of the cementitious compositions of the invention when initiated at elevated temperatures. Addition of an appropriate dosage of alkanolamine and polyphosphate under conditions that yield slurry temperature greater than 90° F. (32° C.) permits a significant reduction of the final setting times.

Polyphosphates

While the preferred polyphosphate is sodium trimetaphosphate (STMP), formulations with other phosphates such as potassium tripolyphosphate (KTPP), sodium tripolyphosphate (STPP), tetrasodium pyrophosphate (TSPP) and tetrapotassium pyrophosphate (TKPP) also provide formulations with enhanced final setting performance and enhanced compressive strength at reduced alkanolamine, e.g., triethanolamine, levels.

The dosage of polyphosphate is about 0.15 to 1.5 wt. %, preferably about 0.3 to 1.0 wt. % and more preferably about 0.5 to 0.75 wt. % based on the cementitious reactive components of the invention. Thus for example, for 100 pounds of cementitious reactive powder, there may be about 0.15 to 1.5 pounds of polyphosphate.

The degree of rapid set obtained with the addition of an appropriate dosage of polyphosphate under conditions that yield slurry temperature greater than 90° F. (32° C.) allows a significant reduction of triethanolamine in the absence of high alumina cement.

Polyphosphates or condensed phosphates employed are compounds having more than one phosphorus atom, wherein the phosphorus atoms are not bonded to each other. However, each phosphorus atom of the pair is directly bonded to at least one same oxygen atom, e.g., P—O—P. The general class of condensed phosphates in the present application includes metaphosphates, and pyrophosphates. The polyphosphate employed is typically selected from alkali metal polyphosphates.

Metaphosphates are polyphosphates which are cyclic structures including the ionic moiety $((PO_3)_n)^{n-}$, wherein n is at least 3, e.g., $(Na_3(PO_3)_3)$. Ultraphosphates are polyphosphates in which at least some of the $PO_4$ tetrahedra share 3 corner oxygen atoms. Pyrophosphates are polyphosphates having an ion of $(P_2O_7)^{4-}$, e.g., $Na_n H_{4-n} (P_2O_7)$ wherein n is 0 to 4.

Set Retarders

Use of set retarders as a component in the compositions of the invention is particularly helpful in situations where the initial slurry temperatures used to form the cement-based products are particularly high, typically greater than 100° F. (38° C.). At such relatively high initial slurry temperatures, retarders such as sodium citrate or citric acid promote synergistic physical and chemical reaction between different reactive components in the compositions resulting in favorable slurry temperature rise response and rapid setting behavior. Without the addition of retarders, stiffening of the reactive powder blend of the invention may occur very rapidly, soon after water is added to the mixture. Rapid stiffening of the mixture, also referred to as "false setting" is undesirable, since it interferes with the proper and complete formation of ettringite, hinders the normal formation of calcium silicate hydrates at later stages, and leads to development of extremely poor and weak microstructure of the hardened cementitious mortar.

The primary function of a retarder in the composition is to keep the slurry mixture from stiffening too rapidly thereby promoting synergistic physical interaction and chemical reaction between the different reactive components. Other secondary benefits derived from the addition of retarder in the composition include reduction in the amount of superplasticizer and/or water required to achieve a slurry mixture of workable consistency. All of the aforementioned benefits are achieved due to suppression of false setting. Examples of some useful set retarders include sodium citrate, citric acid, potassium tartrate, sodium tartrate, and the like. In the compositions of the invention, sodium citrate is the preferred set retarder. Furthermore, since set retarders prevent the slurry mixture from stiffening too rapidly, their addition plays an important role and is instrumental in the formation of good edges during the cement board manufacturing process. The weight ratio of the set retarder to the cementitious reactive powder blend generally is less than 1.0 wt %, preferably about 0.04-0.3 wt %.

Secondary Inorganic Set Accelerators

As discussed above, alkanolamines in combination with polyphosphates are primarily responsible for imparting extremely rapid setting characteristics to the cementitious mixtures. However, in combination with the alkanolamines and polyphosphates, other inorganic set accelerators may be added as secondary inorganic set accelerators in the cementitious composition of the invention.

Addition of these secondary inorganic set accelerators is expected to impart only a small reduction in setting time in comparison to the reduction achieved due to the addition of the combination of alkanolamines and polyphosphates. Examples of such secondary inorganic set accelerators include a sodium carbonate, potassium carbonate, calcium nitrate, calcium nitrite, calcium formate, calcium acetate, calcium chloride, lithium carbonate, lithium nitrate, lithium nitrite, aluminum sulfate and the like. The use of calcium chloride should be avoided when corrosion of cement board fasteners is of concern. The weight ratio of the secondary inorganic set accelerator to the cementitious reactive powder blend typically will be less than 2 wt %, preferably about 0.1 to 1 wt %. In other words for 100 pounds of cementitious reactive powder there is typically less that 2 pounds, preferably about 0.1 to 1 pounds, of secondary inorganic set accelerator. These secondary inorganic set accelerators can be used alone or in combination.

Other Chemical Additives and Ingredients

Chemical additives such as water reducing agents (superplasticizers), may be included in the compositions of the invention. They may be added in the dry form or in the form of a solution. Superplasticizers help to reduce the water demand of the mixture. Examples of superplasticizers include polynapthalene sulfonates, polyacrylates, polycarboxylates, lignosulfonates, melamine sulfonates, and the like. Depending upon the type of superplasticizer used, the weight ratio of the superplasticizer (on dry powder basis) to the reactive powder blend typically will be about 2 wt. % or less, preferably about 0.1 to 1.0 wt.

When it is desired to produce lightweight products such as lightweight cement boards, air-entraining agents (or foaming agents) may be added in the composition to lighten the product.

Air entraining agents are added to the cementitious slurry to form air bubbles (foam) in situ. Air entraining agents are typically surfactants used to purposely trap microscopic air bubbles in the concrete. Alternatively, air entraining agents are employed to externally produce foam which is introduced into the mixtures of the compositions of the invention during the mixing operation to reduce the density of the product. Typically to externally produce foam the air entraining agent (also known as a liquid foaming agent), air and water are mixed to form foam in a suitable foam generating apparatus and then the foam is added to the cementitious slurry.

Examples of air entraining/foaming agents include alkyl sulfonates, alkylbenzolfulfonates and alkyl ether sulfate oligomers among others. Details of the general formula for these foaming agents can be found in U.S. Pat. No. 5,643,510.

An air entraining agent (foaming agent) such as that conforming to standards as set forth in ASTM C 260 "Standard Specification for Air-Entraining Admixtures for Concrete" (Aug. 1, 2006) can be employed. Such air entraining agents are well known to those skilled in the art and are described in the Kosmatka et al. "Design and Control of Concrete Mixtures," Fourteenth Edition, Portland Cement Association, specifically Chapter 8 entitled, "Air Entrained Concrete," (cited in US Patent Application Publication No. 2007/0079733 A1). Commercially available air entraining materials include vinsol wood resins, sulfonated hydrocarbons, fatty and resinous acids, aliphatic substituted aryl sulfonates, such as sulfonated lignin salts and numerous other interfacially active materials which normally take the form of anionic or nonionic surface active agents, sodium abietate, saturated or unsaturated fatty acids and salts thereof, tensides, alkyl-aryl-sulfonates, phenol ethoxylates, lignosulfonates, resin soaps, sodium hydroxystearate, lauryl sulfate, ABSs (alkylbenzenesulfonates), LASs (linear alkylbenzenesulfonates), alkanesulfonates, polyoxyethylene alkyl(phenyl)ethers, polyoxyethylene alkyl(phenyl)ether sulfate esters or salts thereof, polyoxyethylene alkyl(phenyl)ether phosphate esters or salts thereof, proteinic materials, alkenylsulfosuccinates, alpha-olefinsulfonates, a sodium salt of alpha olefin sulphonate, or sodium lauryl sulphate or sulphonate and mixtures thereof.

Typically the air entraining (foaming) agent is about 0.01 to 1 wt. % of the weight of the overall cementitious composition.

Other chemical admixtures such as shrinkage control agents, coloring agents, viscosity modifying agents (thickeners) and internal curing agents may also be added in the compositions of the invention if desired.

Scrims

Discrete reinforcing fibers of different types may also be included in the cementitious compositions of the invention. Scrims made of materials such as polymer-coated glass fibers and polymeric materials such as polypropylene, polyethylene and nylon may be used to reinforce the cement-based product depending upon its function and application. Cement boards, produced according the present invention, are typically reinforced with scrims made of polymer-coated glass fibers.

Aggregates and Fillers

While the disclosed cementitious reactive powder blend defines the rapid setting component of the cementitious composition of the invention, it will be understood by those skilled in the art that other materials may be included in the composition depending on its intended use and application.

For instance, for cement board applications, it is desirable to produce lightweight boards without unduly compromising the desired mechanical properties of the product. This objective is achieved by adding lightweight aggregates and fillers. Examples of useful lightweight aggregates and fillers include blast furnace slag, volcanic tuff, pumice, expanded forms of clay, shale, and perlite, hollow ceramic spheres, hollow plastic spheres, expanded plastic beads, and the like. For producing cement boards, expanded clay and shale aggregates are particularly useful. Expanded plastic beads and hollow plastic spheres when used in the composition are required in very small quantity on weight basis owing to their extremely low bulk density.

Depending on the choice of lightweight aggregate or filler selected, the weight ratio of the lightweight aggregate or filler to the reactive powder blend may be about 1/100 to 200/100, preferably about 2/100 to 125/100. For example, for making lightweight cement boards, the weight ratio of the lightweight aggregate or filler to the reactive powder blend preferably will be about 2/100 to 125/100. In applications where the lightweight product feature is not a critical criterion, river sand and coarse aggregate as normally used in concrete construction may be utilized as part of the composition of the invention.

Initial Slurry Temperature

In the present invention, forming the slurry under conditions which provide an initially high slurry temperature was found to be important to achieve rapid setting and hardening of cementitious formulations. The initial slurry temperature should be at least about 90° F. (32° C.). Slurry temperatures in the range of 90° F. to 160° F. (32° C. to 71° C.) or 90° F. to 135° F. (32° C. to 57° C.) produce very short setting times. The initial slurry temperature is preferably about 120° F. to 130° F. (490 to 54° C.).

In general, within this range increasing the initial temperature of the slurry increases the rate of temperature rise as the reactions proceed and reduces the setting time. Thus, an initial slurry temperature of 95° F. (35° C.) is preferred over an initial slurry temperature of 90° F. (32° C.), a temperature of 100° F. (38° C.) is preferred over 95° F. (35° C.), a temperature of 105° F. (41° C.) is preferred over 100° F. (38° C.), a temperature of 110° F. (43° C.) is preferred over 105° F. (41° C.) and so on. It is believed the benefits of increasing the initial slurry temperature decrease as the upper end of the broad temperature range is approached.

As will be understood by those skilled in the art, achieving an initial slurry temperature may be accomplished by more than one method. Perhaps the most convenient method is to heat one or more of the components of the slurry. In the examples, the present inventors supplied water heated to a temperature such that, when added to the dry reactive powders and unreactive solids, the resulting slurry is at the desired temperature. Alternatively, if desired the solids could be provided at above ambient temperatures. Using steam to provide heat to the slurry is another possible method that could be adopted.

Although potentially slower, a slurry could be prepared at ambient temperatures, and promptly (e.g., within about 10, 5, 2 or 1 minutes) heated to raise the temperature to about 90° F. or higher (or any of the other above-listed ranges), and still achieve benefits of the present invention.

Manufacturing of Precast Concrete Products Such as Cement Boards

Precast concrete products such as cement boards are manufactured most efficiently in a continuous process in which the reactive powder blend is blended with aggregates, fillers and other necessary ingredients, followed by addition of water and other chemical additives just prior to placing the mixture in a mold or over a continuous casting and forming belt.

Due to the rapid setting characteristics of the cementitious mixture it should be appreciated that the mixing of dry components of the cementitious blend with water usually will be done just prior to the casting operation. As a consequence of the formation of hydrates of calcium aluminate compounds and the associated water consumption in substantial quantities the cement-based product becomes rigid, ready to be cut, handled and stacked for further curing.

EXAMPLES

The following examples illustrate the influence of alkanolamine and polyphosphate addition on the slurry temperature rise behavior, setting characteristics and cube compressive strength (CCS) of the cementitious compositions of the invention including, a mixture of portland cement, class C fly ash, and calcium sulfate dihydrate (landplaster) as the components of the reactive powder. The admixtures used were triethanolamine and polyphosphate, e.g., sodium trimetaphosphate, both added as aqueous solutions.

In addition, sodium citrate set retarder and sulfonated napthalene superplasticizer were added to control the fluidity of the mixes. These admixtures were added as weight percentage of the total reactive powder.

The compositions included in Examples 1 through 5 were combined using a weight ratio of water to cement (reactive powder) of 0.43/1 and a weight ratio of expanded clay aggregate to cement (reactive powder) of 0.80/1.

For the sake of comparison with compositions included in U.S. Pat. No. 6,869,474, the compositions included in Example 6 were combined using a weight ratio of water to cement (reactive powder) of 0.40/1 and a weight ratio of expanded clay aggregate to cement (reactive powder) of 0.90/1.

The temperature of the liquids was adjusted prior to mixing with cements to obtain a specific mix temperature. After mixing in a Hobart mixer the mix (about 280 grams) was placed in a 6 ounces STYROFOAM cup and placed in an insulated STYROFOAM box. The temperature response was measured continuously using a computerized data collection program. The maximum temperature rise rate, as well as the maximum temperature and time to maximum temperature were used as indications of the reactivity of the experimental mixtures.

Initial and final set times were determined with Gilmore needles according to ASTM C266. The target was to reach a final set within less than 10 minutes, preferably 5 to 7 minutes, after mixing. For the compressive strength testing cubes (2 inch×2 inch×2 inch) (5.1 cm×5.1 cm×5.1 cm) were kept inside a sealed plastic bag containing a moist towel at a temperature of 68° C. (154° F.) until the time of the test. The compressive strength of 3 cubes from each mix was determined 5 hours after the addition of the mix liquids. The maximum load required to crush the cubes was measured using a SATEC UTC 120HVL compression machine programmed to meet the rate of loading specified by procedure ASTM C109.

The raw materials and ingredients used in these investigations were as follows:

Type III portland cement
Gypsum (Landplaster)
Class C fly ash
Expanded clay/shale aggregate
Triethanolamine (TEA)
Sodium citrate
Sulfonated naphthalene condensate superplasticizer
Sodium trimetaphosphate (STMP), potassium tripolyphosphate (KTPP), sodium tripolyphosphate (STPP)

In the examples below, the dry reactive powder ingredients and any aggregate used were mixed with water under conditions which provided an initial slurry temperature above ambient. Typically hot water was used having a temperature which produced slurry having an initial temperature within the range of 90°-135° F. (32-57° C.).

The examples demonstrate the synergistic roles of set retarder (sodium citrate), alkanolamines (triethanolamine), polyphosphates and slurry temperature. The examples report setting of the composition, characterized by initial and final set times, as measured using the above-mentioned Gilmore needles specified in the ASTM C266 test procedure, as well as high initial compressive strength as per ASTM C109.

Example 1 (Mixes 1-6)

Formulations containing triethanolamine in the range of 0 to 0.05% and sodium trimetaphosphate (STMP) in the range of 0 to 1.0% (relative to weight of cementitious reactive powder) were used to determine the effect of STMP and triethanolamine (TEA) content on the final set and temperature rise characteristics of these compositions. In this example the Type III Portland cement, class C fly ash and landplaster were added in a weight ratio (parts) of 100/40/10. The superplasticizer and the citrate were added as aqueous solutions to the mixes used in this example. FIG. 1 shows that increasing the level of STMP enhanced the rate of temperature rise of such mixtures.

TABLE 1 summarizes the effect of varying the STMP dosages on the characteristics of the temperature rise curves shown in FIG. 1 as well as the final set times determined for these mixes. These results show formulations containing TEA in the range of 0.025 to 0.05% and STMP in the range of 0.75 to 1.0% had final set times at 7 to 8 minutes. In addition, formulations with 0.05% TEA and 0.30% STMP had set times under 14 minutes.

TABLE 1

Compositions[(1)(2)] whose performance is shown in FIG. 1

| Mix ID | STAMP | TEA Wt. % | Sodium citrate | Final Set (min) | Max Temp. Rise (▲ ° F.) | Max Rate of Rise (° F./min) | CCS psi |
|---|---|---|---|---|---|---|---|
| 1 | 0.30 | 0.00 | 0.05 | >120 | 12.8 | 4.3 | 2455 |
| 2 | 1.00 | 0.00 | 0.10 | 16.0 | 27.2 | 15.6 | 2862 |
| 3 | 1.00 | 0.025 | 0.10 | 8.0 | 34.7 | 15.3 | 2371 |
| 4 | 0.00 | 0.05 | 0.05 | 105 | 22.3 | 2.6 | 4357 |
| 5 | 0.30 | 0.05 | 0.05 | 13.9 | 24.0 | 5.3 | 3011 |
| 6 | 0.75 | 0.05 | 0.10 | 7.0 | 44.7 | 10.6 | 3001 |

[(1)] 100 parts Type III portland cement, 40 parts class C fly ash and 10 parts landplaster with 0.40% superplasticizer.
[(2)] Water: cement weight ratio is 0.43:1
[(3)] CCS is an abbreviation for cube compressive strength

Example 2 (Mixes 1-8)

Another set of mixes labeled 1-8 was prepared. TABLE 2 shows these compositions containing portland cement, class C fly ash and landplaster in the weight ratios (parts) of 100/40/15 (mixes 1 through 4) and 100/70/25 (mixes 5 through 8). TABLE 2 also shows mixes 1, 2, 3 and 4 contained 0.05% TEA and the STMP dosages were 0, 0.30, 0.75 and 1.0%, respectively. For mixes 5, 6, 7 and 8 the TEA dosage was kept at 0.10% and the STMP levels were 0, 0.50, 0.75 and 1.0%, respectively.

The results included in TABLE 2 indicate the final setting times are significantly reduced as the STMP dosages are increased. For example, for mix 1 containing 100 parts Type III portland cement, 40 parts class C fly ash and 15 parts landplaster with 0% STMP the final set was measured at 187 minutes. Also, the final set was shortened to around 10 minutes for mix 4 containing 1.0% STMP with the same fly ash and landplaster content as mix 1. Similarly, the final set time of mix 5 containing 100 parts portland cement, 70 parts class C fly ash and 25 parts landplaster was found to be longer than 4 hours compared to just 12 to 17 minutes for mixes 7 and 8 which contained 0.75 and 1.0% STMP.

In addition, the compressive strength data included in TABLE 2 seems to indicate mixes with relatively high dosages of STMP had relatively higher compressive strength combined with sufficiently rapid setting compared to mixes with the intermediate levels of STMP. For example, mixes 1, 3 and 4 with 40 parts fly ash and 15 parts landplaster containing 0, 0.75 and 1.0% STMP, respectively had compressive strengths of 2004, 1165 and 1693 psi compared to 913 psi for mix 2 with 0.30% STMP. Similarly mixes 7 and 8 with 100 parts Type III portland cement, 70 parts fly ash and 25 parts landplaster containing 0.75 and 1.0% STMP, respectively had compressive strengths of 662 and 880 psi compared to 500 psi for mix 6 containing 0.50% STMP.

In contrast, mixes 1 and 5, lacking STMP, had relatively longer final set times. Although mix 1 with 0% STMP had a relatively high compressive strength of 2004 psi, its 187 minute final set time is impractical for the use planned for the present invention.

varying dosages of STMP were compared to mixes containing 0.05% Alum in combination with 0.25% TEA with the same fly ash and landplaster ratio (40/20). In addition the temperature rise and final set times for mixes containing 100 parts Type III portland cement, 60 parts class C fly ash and 20 parts landplaster at varying dosages of STMP were compared to mixes containing 0.05% Alum in combination with 0.25% TEA with the same fly ash and landplaster ratio (60/20).

TABLE 3 shows detailed compositions for each mix used and their corresponding final set times in addition to the temperature rise characteristic of each mix. TABLE 3 indicates the final set time of 42 min measured for mix 2 with Type III portland cement to fly ash to landplaster ratio of 100/40/20 with 0.10% TEA and 0% STMP is significantly longer when compared to the final set of around 7 minutes for

TABLE 2

Compositions[(1)(2)] of Example 2

| Mix ID | Class C Fly Ash Parts | Land plaster Parts | STMP Wt. % | TEA Wt. % | Final Set (min) | Max Temp. Rise (▲ ° F.) | Max Rate of Rise (° F./min) | CCS psi |
|---|---|---|---|---|---|---|---|---|
| 1 | 40 | 15 | 0 | 0.05 | 187 | 16.2 | 2.5 | 2004 |
| 2 | 40 | 15 | 0.30 | 0.05 | 44 | 25.4 | 5.8 | 913 |
| 3 | 40 | 15 | 0.75 | 0.05 | 12.3 | 33.8 | 8.6 | 1165 |
| 4 | 40 | 15 | 1.00 | 0.05 | 10.3 | 31.1 | 7.9 | 1693 |
| 5 | 70 | 25 | 0.0 | 0.10 | >4 hr | 14.0 | 4.2 | 658 |
| 6 | 70 | 25 | 0.50 | 0.10 | 22.5 | 24.3 | 8.7 | 500 |
| 7 | 70 | 25 | 0.75 | 0.10 | 12.3 | 26.2 | 11.1 | 662 |
| 8 | 70 | 25 | 1.0 | 0.10 | 17.3 | 26.1 | 10.8 | 880 |

[(1)]100 parts Type III portland cement, 0.10% sodium citrate and 0.40% superplasticizer.
[(2)]Water:cement weight ratio is 0.43:1

Example 3 (Mixes 1-8)

Another set of mixes labeled 1-8 were made. These formulations containing sodium trimetaphosphate (STMP) with the triethanolamine (TEA) accelerators were compared with formulations containing aluminum sulfate (Alum) in combination with TEA. The temperature rise and final set times for mixes containing 100 parts by weight Type III portland cement, 40 parts class C fly ash and 20 parts landplaster at mix 1 with 0.25% TEA and 0.05% Alum with the same Type III portland cement to fly ash to landplaster ratio. In contrast, for mixes 3 and 4 with 0.3 and 0.75% STMP final set times less than 7 minutes are achieved.

In addition, for mixes 3 and 4 the compressive strength after 5 hours was measured at 722 and 1191 psi, respectively, compared to 703 psi for mix 1 with 0.25% TEA and 0.05% Alum. Similar results were obtained for mixes with the Type III portland cement to fly ash to landplaster ratio of 100/60/20 as indicated by the results for mixes 5, 6, 7 and 8 included in TABLE 3.

TABLE 3

Compositions[(1)(2)] of Example 3

| Mix ID | Class C Fly Ash Parts | TEA | Alum (Al$_2$(SO$_4$)$_3$) Wt. % | STMP | Final Set (min) | Max Temp. Rise (▲ ° F.) | Max Rate of Rise (° F./min) | CCS psi |
|---|---|---|---|---|---|---|---|---|
| 1 | 40 | 0.25 | 0.05 | 0.0 | 6.75 | 31.2 | 9.4 | 703 |
| 2 | 40 | 0.10 | 0.0 | 0.0 | 41.7 | 14.6 | 4.2 | 1979 |
| 3 | 40 | 0.10 | 0.0 | 0.30 | 6.75 | 31.4 | 7.8 | 722 |
| 4 | 40 | 0.10 | 0.0 | 0.75 | 6.5 | 31.8 | 7.6 | 1191 |
| 5 | 60 | 0.25 | 0.05 | 0.0 | 16 | 33.3 | 8.9 | 471 |
| 6 | 60 | 0.10 | 0.0 | 0.0 | 85 | 20.1 | 6.3 | 366 |
| 7 | 60 | 0.10 | 0.0 | 0.30 | 13.3 | 35.4 | 10.7 | 445 |
| 8 | 60 | 0.10 | 0.0 | 0.75 | 7.3 | 38.0 | 13.2 | 665 |

[(1)]100 parts by weight Type III portland cement, 20 parts landplaster, 0.10% sodium citrate and 0.40% superplasticizer.
[(2)]Water:cement weight ratio is 0.43:1

Example 4 (Mixes 1-12)

Another set of mixes, labeled 1-12, were made. The compressive strengths for these mixes containing 100 parts Type III portland cement, 60 parts class C fly ash and 20 parts landplaster at various combinations of sodium trimetaphosphate (STMP) and triethanolamine (TEA) were evaluated. TABLE 4 shows detailed compositions for each mix used and their corresponding final set times and the temperature rise parameters. TABLE 4 shows mix 12 containing 0.05% TEA and 0.60% STMP has the best combination of the final setting times (9.3 min) and compressive strength (836 psi). Mix 11 containing 0% TEA and 0.65% STMP had the highest compressive strength measured at 1396 psi, but the final setting time measured for this mix was extended to 138 min. Mix 10 containing 0.65% TEA and 0% STMP had final set times of less than 5.5 min, however the compressive strength of 649 psi is significantly lower compared to that of mix 12.

The compressive strength data included in TABLE 4 shows the mixes with the highest compressive strength contain TEA in the range of 0.05 to 0.10% and STMP in the range of 0.50 to 0.60%.

TABLE 4

Compositions[1][2] used in Example 4

| Mix ID | Class C Fly Ash Parts | Land-plaster Parts | TEA Wt. % | STMP Wt. % | Final Set (min) | Max Temp. Rise (▲ ° F.) | Max Rate of Rise (° F./min) | CCS psi |
|---|---|---|---|---|---|---|---|---|
| 1 | 60 | 20 | 0.10 | 0.00 | 47.3 | 24.8 | 8.25 | 645 |
| 2 | 60 | 20 | 0.00 | 0.10 | 180 | 10.2 | 4.00 | 171 |
| 3 | 60 | 20 | 0.05 | 0.05 | 51.3 | 19.8 | 6.50 | 711 |
| 4 | 60 | 20 | 0.30 | 0.00 | 7.5 | 39.2 | 7.00 | 506 |
| 5 | 60 | 20 | 0.00 | 0.30 | 180 | 11.4 | 5.00 | 579 |
| 6 | 60 | 20 | 0.15 | 0.15 | 8.5 | 33.6 | 9.25 | 455 |
| 7 | 60 | 20 | 0.50 | 0.00 | 6.5 | 39.8 | 9.00 | 531 |
| 8 | 60 | 20 | 0.00 | 0.50 | 45.2 | 17.4 | 5.75 | 830 |
| 9 | 60 | 20 | 0.25 | 0.25 | 5 | 40.9 | 10.50 | 604 |
| 10 | 60 | 20 | 0.65 | 0.00 | <5.5 | 49.2 | 17.25 | 649 |
| 11 | 60 | 20 | 0.00 | 0.65 | 138 | 21.6 | 8.00 | 1396 |
| 12 | 60 | 20 | 0.05 | 0.60 | 9.3 | 32.1 | 10.50 | 836 |

[1] 100 parts Type III portland cement 100 parts, Class C fly ash, 0.10% sodium citrate and 0.40% superplasticizer.
[2] Water:cement weight ratio 0.43:1

Example 5 (Mixes 1-12)

Another set of mixes 1-12 were made. The 5 hour compressive strength and temperature rise for these mixes containing 100 parts Type III portland cement, 40 parts class C fly ash and 20 parts landplaster at various combinations of triethanolamine (TEA) with three different phosphates, potassium tripolyphosphate (KTPP), sodium tripolyphosphate (STPP) and sodium trimetaphosphate (STMP) were compared. The data included in TABLE 5 shows that, for mixes 1, 5 or 9 with 0.15 wt. % TEA, using 0.60% KTPP, STPP or STMP produces mixes with acceptable final set in the range of 6 to 8 minutes and compressive strengths between 1333 and 2374 psi. However, as the TEA is reduced to 0.05 to 0.10% only mixes 10 and 11 with 0.75 and 0.85 wt. % STMP produce formulations with acceptable final sets about 5 to 6 min and compressive strengths in the range of 1769 to 2032 psi.

Figure 2:
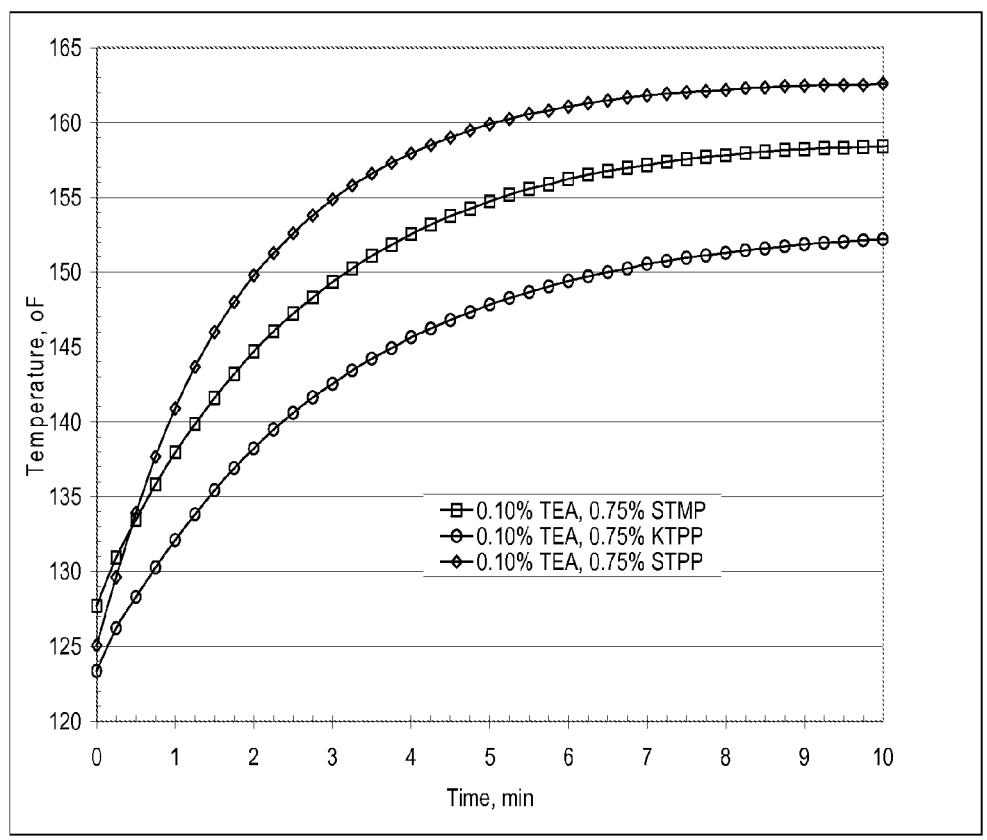
FIG. 2 is a graph of the results of Example 5 showing a comparison of the temperature rise for mixes containing 100 parts by weight of Type III portland cement, 40 parts by weight class C fly ash, 20 parts by weight landplaster, 0.10 wt. % triethanolamine with 0.75 wt. of one of % potassium tripolyphosphate (KTPP), sodium tripolyphosphate (STPP) or sodium trimetaphosphate (STMP).

TABLE 5 shows mixes 9, 10, 11 and 12 containing 0.60%, 0.75%, 0.85% and 1.0% STMP, respectively had a relatively higher rate of temperature rise and higher maximum temperature compared to mixes 1, 2, 3 and 4 with KTPP and mixes 5, 6, 7 and 8 with STPP at similar dosages of TEA. FIG. 2 compares mixes 2, 6 and 10 containing 0.10% TEA with 0.75% of KTPP, STPP and STMP, respectively. FIG. 3 shows mix 10 containing STMP achieved higher temperatures relatively faster compared with mixes 2 and 6 containing KTPP and STPP. The end results was a rate of rise (near 13° F./min as shown in TABLE 5) that was almost double the rate of temperature rise measured (7° F./min) for mixes with KTPP and STPP.

TABLE 5

Compositions[1] used in Example 5

| Mix ID | TEA | KTPP | STPP | STMP | Final Set (min) | Max Temp. Rise (▲ ° F.) | Max Rate of Rise (° F./min) | CCS psi |
|---|---|---|---|---|---|---|---|---|
| 1 | 0.15 | 0.60 | | | 7.2 | 38.3 | 8.7 | 2374 |
| 2 | 0.10 | 0.75 | | | 17.3 | 30.8 | 7.0 | 2559 |
| 3 | 0.05 | 0.85 | | | 16.3 | 27.8 | 6.2 | 2793 |
| 4 | 0.025 | 1.0 | | | 22.1 | 16.3 | 3.9 | 2714 |
| 5 | 0.15 | | 0.60 | | 8 | 35.7 | 9.3 | 2049 |
| 6 | 0.10 | | 0.75 | | 13.3 | 29.2 | 7.4 | 2683 |
| 7 | 0.05 | | 0.85 | | 29 | 23.1 | 6.0 | 2928 |
| 8 | 0.025 | | 1.0 | | 27.5 | 19.1 | 5.2 | 3189 |
| 9 | 0.15 | | | 0.60 | 6.1 | 45.6 | 14.9 | 1333 |
| 10 | 0.10 | | | 0.75 | 5.2 | 37.5 | 12.9 | 1769 |
| 11 | 0.05 | | | 0.85 | 6 | 33.5 | 15.6 | 2032 |
| 12 | 0.025 | | | 1.0 | 34.3 | 29.0 | 17.6 | 2551 |

[1] 100 parts Type III portland cement 100 parts, 40 parts Class C fly ash, 20 parts Landplaster, 0.10% sodium citrate and 0.40% superplasticizer.
[2] Water:cement weight ratio 0.43:1

Example 6

This example evaluated mixes with similar composition as those in U.S. Pat. No. 6,869,474.

A cement powder mix containing 100 parts of Type III portland cement and 90 parts of class C fly ash was mixed with 90 parts of expanded clay aggregate at various combinations of sodium trimetaphosphate (STMP) and triethanolamine (TEA). The compressive strength of 3 cubes from each mix was measured 5 hours after mixing with water. The cubes were kept at a temperature of 68° C. (154° F.) until the time of testing. TABLE 6 shows detailed composition for each mix used and their corresponding test results for final set time and the compressive strength measurements as per above-mentioned test procedure ASTM C109.

TABLE 6 shows invention mixes number 11, 12 and 13 containing TEA at 0.20, 0.10% and 0.05% with STMP at 0.60, 0.70 and 0.75%, respectively had the best combination of final setting times of 4.5 and 6.5 and 8.5 min and 5-hour compressive strength of 923, 1042 and 1676 psi, respectively. This example shows the benefit of combining STMP and TEA in achieving compositions with a combination of advantageously high strength and rapid final set time.

TABLE 6

Mixture compositions of Example 6[1]

| Mix Id. | Reactive Powder Blend (parts/100 parts of Portland Cement) | | | TEA | STMP | Compressive Strength psi | Final Set Time min |
|---|---|---|---|---|---|---|---|
| | Portland Cement (PC) | Class C Fly Ash (FA) | Land plaster (G) | wt % of reactive powder blend | | | |
| A (Conventional #1) | 100 | 90 | 0.0 | 2.0 | 0.0 | 383 | 7.0 |
| B (Invention #1) | 100 | 90 | 0.0 | 0.0 | 2.0 | 2596 | 27.0 |
| C (Invention #2) | 100 | 90 | 0.0 | 1.0 | 1.0 | 457 | 5.5 |
| D (Conventional #2) | 100 | 90 | 0.0 | 1.0 | 0.0 | 222 | 7.2 |
| E (Invention #3) | 100 | 90 | 0.0 | 0.0 | 1.0 | 1995 | 18.0 |
| F (Invention #4) | 100 | 90 | 0.0 | 0.5 | 0.5 | 341 | 5.0 |
| G (Conventional #3) | 100 | 90 | 0.0 | 0.50 | 0.0 | 219 | 7.5 |
| H (Invention #5) | 100 | 90 | 0.0 | 0.0 | 0.50 | 1616 | 10.8 |
| I (Invention #6) | 100 | 90 | 0.0 | 0.25 | 0.25 | 385 | 6.7 |
| J (Conventional #4) | 100 | 90 | 0.0 | 0.20 | 0.0 | 623 | 19.5 |
| K (Invention #7) | 100 | 90 | 0.0 | 0.00 | 0.20 | 748 | 19.0 |
| L (Invention #8) | 100 | 90 | 0.0 | 0.10 | 0.10 | 832 | 12.0 |
| M (Conventional #5) | 100 | 90 | 0.0 | 0.8 | 0.0 | 221 | 8.5 |
| N (Invention #9) | 100 | 90 | 0.0 | 0.5 | 0.3 | 334 | 12.0 |
| O (Invention #10) | 100 | 90 | 0.0 | 0.3 | 0.5 | 672 | 5.0 |
| P (Invention #11) | 100 | 90 | 0.0 | 0.20 | 0.6 | 923 | 4.5 |
| Q (Invention #12) | 100 | 90 | 0.0 | 0.10 | 0.70 | 1042 | 6.5 |
| R (Invention #13) | 100 | 90 | 0.0 | 0.05 | 0.75 | 1676 | 8.5 |
| S (Invention #14) | 100 | 90 | 0.0 | 0.025 | 0.775 | 2408 | 9.5 |
| T (Invention #15) | 100 | 90 | 0.0 | 0.0 | 0.80 | 2932 | 13.5 |

[1] Sodium citrate 0.07 wt % of reactive powder blend, superplasticizer 0.50 wt % of reactive powder blend and Water/reactive powder weight ratio - 0.40/1

Although we have described the preferred embodiments for implementing our invention, it will be understood by those skilled in the art to whom this disclosure is directed that modifications and additions may be made to our invention without departing from its spirit and scope.

The invention claim is:

1. A method of providing a fast setting cementitious mixture comprising:
   mixing
   water,
   a cementitious reactive powder comprising hydraulic cement, and
   a set accelerating amount of alkanolamine and polyphosphate,
   under conditions which provide a mixture temperature of at least about 90° F.

2. The method of claim 1, wherein the mixture has a temperature of about 90-135° F.

3. The method of claim 1, wherein the mixture has a temperature of at least about 100° F.

4. The method of claim 1, wherein the mixture has a temperature of at least about 105° F.

5. The method of claim 1, wherein the polyphosphate is selected from at least one member of the group consisting of sodium trimetaphosphate, potassium tripolyphosphate, sodium tripolyphosphate, tetrasodium pyrophosphate and tetrapotassium pyrophosphate.

6. The method of claim 1, wherein the polyphosphate is provided in an amount of about 0.15 to 1.5 wt. % phosphate based on the weight of the cementitious reactive powder.

7. The method of claim 1, wherein the polyphosphate is provided in an amount of about 0.3 to 1.0 wt. % based on the weight of the cementitious reactive powder.

8. The method of claim 1, wherein the polyphosphate is provided in an amount of about 0.4 to 0.75 wt. % based on the weight of the cementitious reactive powder.

9. The method of claim 1, wherein the alkanolamine is selected from the group consisting of triethanolamine, diethanolamine, monoethanolamine and mixtures thereof.

10. The method of claim 1, wherein the alkanolamine is provided in an amount of about 0.025 to 1 wt. % based on the weight of the cementitious reactive powder.

11. The method of claim 1, wherein the alkanolamine is provided in an amount of about 0.05 to 0.25 wt. % based on the weight of the cementitious reactive powder.

12. The method of claim 1, wherein the polyphosphate comprises sodium trimetaphosphate and is provided in an amount of about 0.4 to 0.75 wt. % based on the weight of cementitious reactive powder,
   wherein the alkanolamine comprises triethanolamine and is provided in an amount of about 0.05 to 0.1 wt. % based on the weight of the cementitious reactive powder.

13. The method of claim 1, wherein the cementitious reactive powder comprises the hydraulic cement and optionally at least one member of the group consisting of a mineral additive, calcium aluminate cement, and calcium sulfate.

14. The method of claim 1, wherein the hydraulic cement comprises portland cement.

15. The method of claim 1, wherein the cementitious reactive powder further comprises a mineral additive.

16. The method of claim 1, wherein the cementitious reactive powder further comprises fly ash.

17. The method of claim 1, wherein the cementitious reactive powder further comprises calcium sulfate.

18. The method of claim 1, wherein the cementitious reactive powder comprises about 40 to 80 wt % portland cement, 0 to 20 wt % calcium aluminate cement, 0 to 7 wt % calcium sulfate, 0 to 55 wt % fly ash, based on the sum of the portland cement, calcium aluminate cement, calcium sulfate and fly ash.

19. The method of claim 1, wherein the cementitious reactive powder comprises about 40 to 80 wt. % portland cement and 20 to 60 wt. % fly ash based on the sum of the portland cement and fly ash.

20. The method of claim 1, wherein the mixture further comprises an aggregate.

21. The method of claim 1, further comprising admixing at least one member of the group consisting of set retarder, air-entraining agent, secondary inorganic set accelerator, and superplasticizer to the mixture.

22. The method of claim 1, wherein the mixture further comprises a set retarder.

23. The method of claim 1, wherein the mixture further comprises an air-entraining agent.

24. The method of claim 1, wherein the mixture further comprises a secondary inorganic set accelerator.

25. The method of claim 1, wherein the mixture further comprises a superplasticizer.

26. The method of claim 1, wherein the mixture temperature is achieved 0 to 5 minutes after forming the mixture by heating one or more of the components of the mixture.

27. The method of claim 1, comprising providing sufficient water to form the mixture as a slurry.

28. A composition for preparing a cement board comprising a mixture of:
a cementitious reactive powder comprising:
(a) hydraulic cement; and
(b) optional mineral additive;
an alkanolamine and polyphosphate as accelerators for components (a) and (b); and
water,
formed by a method comprising mixing the mixture at a temperature of at least 90° F.

29. The composition of claim 28, wherein the polyphosphate is at least one member selected from the group consisting of sodium trimetaphosphate, potassium tripolyphosphate, sodium tripolyphosphate, tetrasodium pyrophosphate and tetrapotassium pyrophosphate and mixtures thereof.

30. The composition of claim 28, wherein the mixture comprises about 0.15 to 1.5 wt. % phosphate based on the weight of the cementitious reactive powder.

31. The composition of claim 28, wherein the mixture comprises about 0.3 to 1.0 wt. % phosphate based on the weight of cementitious reactive powder.

32. The composition of claim 28, wherein the mixture comprises about 0.4 to 0.75 wt. % phosphate based on the weight of cementitious reactive powder.

33. The composition of claim 28, wherein the alkanolamine is selected from the group consisting of triethanolamine, diethanolamine, monoethanolamine and mixtures thereof.

34. The composition of claim 28, wherein the mixture comprises about 0.025 to 1 wt. % alkanolamine based on the weight of the cementitious reactive powder.

35. The composition of claim 28, wherein the mixture comprises about 0.05 to 0.25 wt. % alkanolamine based on the weight of the cementitious reactive powder.

36. The composition of claim 28, wherein the mixture comprises:
about 0.4 to 0.75 wt % phosphate based on the weight of cementitious reactive powder, wherein the phosphate comprises sodium trimetaphosphate, and
about 0.05 to 0.1 wt % alkanolamine based on the weight of the cementitious reactive powder, wherein the alkanolamine comprises triethanolamine.

37. The composition of claim 28, wherein the cementitious reactive powder comprises the hydraulic cement and optionally at least one member of the group consisting of a mineral additive, calcium aluminate cement, and calcium sulfate.

38. The composition of claim 28, wherein the hydraulic cement comprises portland cement.

39. The composition of claim 28, wherein the mixture further comprises a mineral additive.

40. The composition of claim 28, wherein the mixture further comprises fly ash.

41. The composition of claim 28, further comprising at least one member selected from the group consisting of aggregate, set retarder, foaming agent, air-entraining agent, secondary inorganic set accelerator, superplasticizer and mixtures thereof.

42. The composition of claim 28, comprising sufficient water to form a slurry.

* * * * *